March 23, 1943. L. M. SIGLER 2,314,741
MACHINE FOR OPENING EGGS AND SEPARATING THE CONTENTS
Filed Sept. 19, 1941
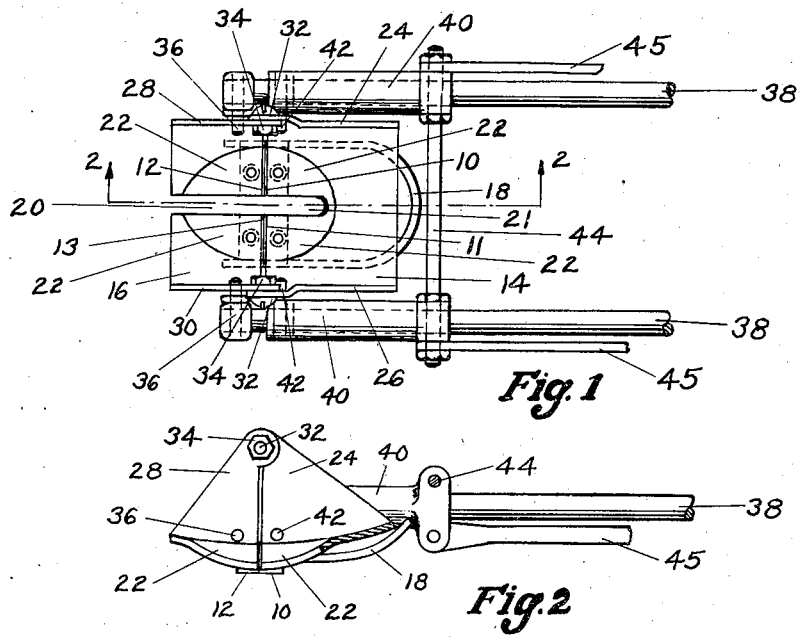
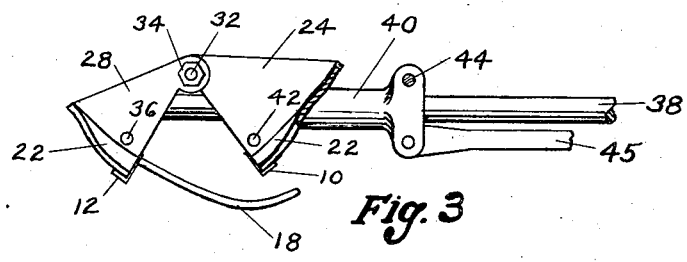
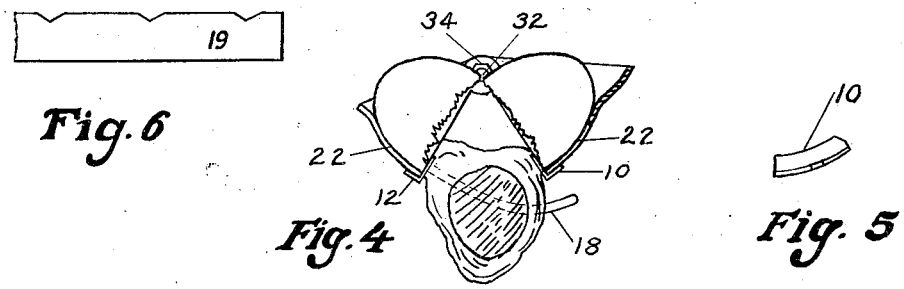
INVENTOR.
BY Laurence M Sigler
Roy M. Eilers Patented Mar. 23, 1943

2,314,741

UNITED STATES PATENT OFFICE 2,314,741

MACHINE FOR OPENING EGGS AND SEPARATING THE CONTENTS

Laurence M. Sigler, St. Louis, Mo., assignor of one-third to Kathryn B. Gill and one-third to James C. Gill, both of San Francisco, Calif.

Application September 19, 1941, Serial No. 411,477

12 Claims. (Cl. 146—2)

This invention relates to improvements in machines for opening eggs and separating the contents thereof. More particularly, the invention relates to improvements in the egg-opening elements of machines for opening eggs and separating the contents thereof.

It is an object of the invention to provide an improved egg-opening element for machines for opening eggs and separating the contents thereof.

This invention consists of certain new and useful improvements in the machine for opening eggs and separating the contents thereof disclosed in my Patent No. 2,229,349. These improvements in the machine for opening eggs and separating the contents thereof have made the machine a better and more efficient device.

In the machine for opening eggs and separating the contents thereof disclosed in my Patent No. 2,229,349, eggs are moved into position by a channel and are held in position by a pressure head. While in that position, a set of egg-opening prongs are actuated to break the egg shell. The ideal egg-opening device is one that breaks the egg shell cleanly, and then separates the two parts of the shell, thereby permitting the yolk to drop intact into a container beneath the egg-opening device. The egg-opening device shown in my Patent No. 2,229,349, consisting of a set of prongs, was invented in an endeavor to provide an ideal egg-opening device. The prongs were brought together and were then actuated to break the shell of the egg. When the prongs had cracked a part of the shell of the egg and had penetrated the cracked part, they were moved apart. In moving apart, the prongs cooperated with the pressure head to split open the sides of the egg. The portion of the egg in contact with the pressure head would then crack, but would not part in two. This portion would act as a hinge and hold the two parts of the shell together. By holding the two parts together, the hingelike portion kept the parts of the shell from falling into the receptacle for the egg yolks. In the majority of cases, the prongs would break the egg shell at its middle and would split the shell into two equal parts. In these cases, the prongs would open the halves of the eggs and the yolk would drop intact into a receptacle beneath the prongs. In some cases, however, the prongs would not split the egg shell at its middle, or the hingelike portion of the egg shell in contact with the pressure head would split apart. In the first case, the yolk would not promptly drop into the receptacle but would be held temporarily by the larger piece of the shell. As the prongs continued to separate, the yolk would slide from the part of the shell in which it was held, but in doing so it would have to pass over the edge of one of the prongs. The edge of the prong might break the yolk. This is not desirable and should be obviated. In the other case, where the hingelike portion of the egg in contact with the pressure head parted, the parts of the egg shell might fall into the receptacle that should receive the white and yolk of the egg. This is also objectionable. The present invention avoids these occurrences by providing an improved egg-opening device that always forces the egg shell to open like a hinge. It is, therefore, an object of the present invention to provide an improved egg-opening device that always forces the egg shell to open like a hinge.

The prongs in the egg-breaking device disclosed in my Patent No. 2,229,349, were rather narrow, and would break the shell of the egg at two points only. The breaking of the egg at a few points only, resulted in a chipping of the egg shell. The chipping of the shell might permit small pieces of the shell to drop into the receptacle for the eggs. This is objectionable. The present invention obviates this objection by providing egg-breaking prongs that conform approximately to the profile of the egg and break a good portion of the egg shell. This gives a cleaner break and avoids the formation of small chips. It is, therefore, an object of the present invention to provide prongs for the egg-opening device that conform approximately to the profile of the egg.

To make certain that the egg shells open in hingelike fashion, it is necessary to provide an egg-opening member that properly holds the egg shell. The egg-opening member must not only hold the egg shell properly, but it must have a pivot that is located approximately at the upper edge of the egg. This is necessary to prevent movement of the egg shell relative to the parts of the egg-opening member. If the pivot were positioned above or below the approximate level of the upper edge of the egg, the opening of the egg would cause a movement of the shell relative to the parts of the member. This movement would probably result in a complete severance of the two parts of the egg. This would prevent the hingelike opening of the egg shell. The egg-opening member should also be provided with means to limit the opening of the egg shell. If the parts of the shell are opened too far, the hingelike portion of the shell will break and the two parts of the shell will be separated. This is objectionable since the separate parts might drop into the receptacle for the contents of the egg. An ideal egg-opening member must have a pivot located approximately at the level of the upper side of the egg and must have means to limit the opening of the egg shell. Such an egg-opening member is provided by the invention.

Other objects and advantages of the invention will appear from the drawing and accompanying description.

In the drawing and accompanying description, a preferred embodiment of the invention is shown and described, but it is to be understood that the drawing and accompanying description do not limit the invention and the invention will be defined by the appended claims.

In the drawing, Fig. 1 is a plan view of the preferred embodiment of the invention.

Fig. 2 is a partial cross-sectional side elevational view of the egg-opening device as it appears in the closed position.

Fig. 3 is a partial cross-sectional side elevational view of the device in Fig. 2 as it appears in the open position.

Fig. 4 is a partial cross-sectional view of the egg-opening device with an egg that it has broken and split apart.

Fig. 5 is a front elevational view of one of the egg-opening prongs provided by the invention, and Fig. 6 is a side elevational view of a portion of the egg-moving channel used with the invention.

Referring to the drawing in detail, an egg-opening prong is denoted by the numeral 10. A second prong, denoted by the numeral 12, is positioned in proximity to prong 10 to form a cooperating set of egg-opening prongs. Prongs 11 and 13 are positioned similarly to prongs 10 and 12, and form a complementary cooperating set of egg-opening prongs. Prongs 10 and 11 are removably attached to egg-receiving pocket 14, and prongs 12 and 13 are removably attached to egg-receiving pocket 16. Each of the prongs 10, 11, 12, and 13 is preferably made so that it is subtaintially L-shaped in cross section. The bottom portion of each prong is attached to the bottom of one or the other of the egg-receiving pockets 14 and 16 by any suitable means such as a bolt or screw. The upstanding portion of each of the prongs engages the edge of the egg-receiving pocket to which it is secured, and extends above the edge of the egg-receiving pocket. The upper ends of the upstanding portions of the prongs constitute the egg-breaking portions of the device. The upper ends of the upstanding portions of the prongs should be sharp enough to break the egg shell cleanly, but should not be so sharp that they break the yolk of the egg. The keenness of the upper ends of the upstanding portions of the prongs must be determined by experimentation. The pocket 16 consists of two halves that are attached together for conjoint movement by a connecting member 18. The two halves of the pocket 16 are spaced apart by a gap 20. This gap is provided to accommodate the channel 19 that moves the eggs into the egg-opening position. Each of the halves of the pocket 16 has a portion 22 that is substantially complementary to a portion of the profile of an egg. The pocket 14 is also provided with portions 22 that are substantially complementary to a portion of the profile of an egg. The pocket 14 also has a slot 21 therein. The portions 22 operate to maintain the parts of the egg shell in position after the shell of the egg has been broken. Pocket 14 has upstanding sides 24 and 26 and pocket 16 has upstanding sides 28 and 30. The upstanding side 24 of egg-receiving pocket 16 is pinned to the upstanding side 28 of the egg-receiving pocket 14 and the upstanding side 26 of egg-receiving pocket 16 is pinned to the upstanding side of egg-receiving pocket 14. The upstanding sides of the pockets may be pinned together in any suitable manner and one such manner is shown in the drawing, by bolts 32 and nuts 34. The pinning together of the upstanding sides of egg-receiving pockets 14 and 16 causes the pockets to move in a hingelike fashion. The upstanding sides of pocket 16 are pivotally mounted on pins 36 that are secured to links 38 of the machine. The links 38 are operated by mechanism, not shown, to move the prongs 10, 11, 12, and 13 on the egg-receiving pockets 14 and 16 into engagement with an egg. Slidably supported on each of the links 38 is a sleeve 40. Each of the sleeves carries a pin 42 that is pivotally secured to one or the other of the upstanding sides 24 and 26 of egg-receiving pocket 14. The sleeves 40 are connected together for conjoint movement by a bar 44. The sleeves 40 are actuated by links 45 that are controlled by a mechanism, not shown, to open and close the egg-receiving pockets. The mechanism causes the sleeves 40 to reciprocate and thereby open and close the egg-receiving pockets. As the sleeves 40 move back, the pocket 14 will rotate about pins 42. The rotation of pocket 14 will cause a rotation of pocket 16 about pins 36. The pockets are pivotally related together by bolts 32 and nuts 34, and will open in a hingelike manner. The mechanism that actuates the sleeves 40, is so arranged that the pockets can separate only a predetermined distance.

The operation of the egg-opening device is simple. The links 38, that carry the egg-receiving pockets 14 and 16, maintain the bottom portions of the pockets below the upper portion of the channel 19 that moves the eggs into position. A portion of this channel 19 extends through gap 20 in pocket 16 and slot 21 in pocket 14. The channel 19 moves an egg into the egg-opening position. The links 38 are then actuated by suitable cams, not shown, and are rotated into position. This rotation forces the prongs 10, 11, 12, and 13 to impinge against the bottom of an egg held by the egg conveyor. When this happens, the upper edges of the prongs break the shell of the egg and pass through the shell. The bottom of the egg then rests in the portions 22 of the pockets 14 and 16. At the moment when the prongs are striking the bottom of the egg shell, a pressure head, not shown, engages the top of the egg shell and maintains the egg in position. After the shell has been broken, a portion of the machines actuates the sleeves 40 and moves the sleeves 40 relative to the links 38. The movement of sleeves 40 relative to the links 38, results in a separation of the upper edges of the prongs 10, 11, 12, and 13. These edges extend into the interior of the egg. As these edges separate, they each exert force on the part of the egg shell in contact with them and split the sides of the egg. The upstanding sides 24 and 26, and 28 and 30 of pockets 16 and 14 are so dimensioned that the bolt and nut assemblies 32 and 34 are approximately at the level of the top of the egg held in the pockets. The nut and bolt assembly will cause the prongs 10, 11, 12, and 13 to move in arcuate paths and thereby open the egg shell in a hingelike manner. The opening of the shell is definitely limited to prevent a complete severance of the two parts of egg shell. The hingelike opening of the shell is shown in Fig. 4 and it permits the contents of the egg to drop cleanly from the shell and fall intact into a receptacle below the prongs. This arrangement prevents a breaking of the shell into two separate parts. This is advantageous since the separate parts of the shell might fall between the prongs and drop into the receptacle for the contents of the egg. After the contents of the egg have dropped from the two portions of the shell, the links 38 are rotated in an upward direction by a mechanism, not shown, causing the shell to be catapulted into a disposal chute, not shown.

The upper edges of the prongs 10, 11, 12, and 13, extend almost all the way across the edges of the pockets 14 and 16. In addition, these upper edges are preferably curved to conform approximately to the profile of an egg, but they may be made in any desirable manner. The curvature of the prongs is shown particularly in Fig. 5. By reason of this curvature, the upper edges of the prongs make a long, clean break that facilitates the splitting open of the egg and avoids the formation of little egg chips. These chips might fall into the receptacle for the white and yolk of the egg. This would be objectionable, and is avoided by the use of the particular prongs used.

By use of the present invention, the egg separator disclosed in my Patent No. 2,229,349 can be made a more efficient and a better device. The drawing and descriptions have shown and described a preferred embodiment of the invention, but it is obvious to those skilled in the art that various changes in the form of the invention may be made without affecting the scope of the invention.

What I claim is:

1. An egg-opening device, that is adapted for use in machines for opening eggs and separating the contents thereof, to open eggs in hingelike fashion, comprising a pair of egg-receiving pockets, each of said pockets having upstanding sides that are pivotally connected to the corresponding sides of the other pocket to permit movement of the pockets relative to each other in hingelike fashion around an axis substantially perpendicular to said sides, said upstanding sides being dimensioned so the pivotal connections of the upstanding sides are approximately at the level of the top of an egg held by the pockets whereby movement of the pockets relative to each other will cause a portion of the top of the egg to crack and form a hinge for the rest of the egg during the egg-opening operation, said pockets having portions that conform approximately to the contour of a portion of an egg and are adapted to position the shell of the egg after the egg-breaking operation, egg-opening prongs carried by the said pockets, said egg-opening prongs conforming approximately to the contour of a portion of an egg, and means to move the pockets relative to each other.

2. An egg-opening device, that is adapted for use in machines for opening eggs and separating the contents thereof, to open eggs in hingelike fashion, comprising a pair of egg-receiving pockets, each of said pockets having upstanding sides that are pivotally connected to the corresponding sides of the other pocket by a plurality of pivots that define a horizontal axis and permit movement of the pockets relative to each other in hingelike fashion, at least one of said pockets having an open end and each of said pockets having open upper portions whereby eggs to be opened can be moved into said pockets through said open end of said one pocket and the opened eggs can be ejected through said open upper portions of said pockets, said pockets having portions that conform approximately to the contour of a portion of an egg and are adapted to position the shell of the egg after the egg-breaking operation, egg-opening prongs carried by the said pockets, said egg-opening prongs conforming approximately to the contour of a portion of an egg, and means to move the pockets relative to each other.

3. An egg-opening device, that is adapted for use in machines for opening eggs and separating the contents thereof, to open eggs in hingelike fashion, comprising a pair of egg-receiving pockets, each of said pockets having upstanding sides that are pivotally connected to the corresponding sides of the other pocket to permit movement of the pockets relative to each other in hingelike fashion, said upstanding sides being dimensioned so the pivotal connections of the upstanding sides are approximately at the level of the top of an egg held by the pockets, at least one of said pockets having an open end and each of said pockets having open upper portions whereby eggs to be opened can be moved into said pockets through said open end of said one pocket, and the opened eggs can be ejected through said open upper portions of said pockets, egg-opening prongs carried by the said pockets, said egg-opening prongs conforming approximately to the contour of a portion of an egg, and means to move the pockets relative to each other.

4. An egg-opening device, that is adapted for use in machines for opening eggs and separating the contents thereof, to open eggs in hingelike fashion, comprising a pair of links, a sleeve slidably supported on each of the links, an egg-receiving pocket pivotally connected to the said links, an egg-receiving pocket pivotally connected to the said sleeves, each of said pockets having upstanding sides that are pivotally connected to the corresponding sides of the other pocket to permit movement of the pockets relative to each other in hingelike fashion, said upstanding sides being dimensioned so the pivotal connections between corresponding upstanding sides are approximately at the level of the top of an egg held by the pockets, said pockets having portions that conform approximately to the contour of a portion of an egg and are adapted to position the shell of the egg after the egg-breaking operation, slots in the said pockets to accommodate an egg-moving means that moves eggs into the egg-opening position, egg-opening prongs carried by the said pockets, said egg-opening prongs conforming approximately to the contour of a portion of an egg, and means to move the sleeves and thereby move the pockets relative to each other, said pocket-moving means being arranged to limit movement of the pockets.

5. An egg-opening device, that is adapted for use in machines for opening eggs and separating the contents thereof, to open eggs in hingelike fashion, comprising a pair of egg-receiving pockets, each of said pockets having upstanding sides that are pivotally connected to the corresponding sides of the other pocket to permit movement of the pockets relative to each other in hingelike fashion around an axis substantially perpendicular to said sides, egg-opening prongs carried by the said pockets, said egg-opening prongs conforming approximately to the contour of a portion of an egg, and means to move the pockets relative to each other, said pockets being arranged so relative movement therebetween causes a separating action at the bottom of the egg and a resultant downward action at the top of the egg whereby the bottom and sides of the egg will break and the top of the egg will crack to form a hinge that holds the parts of the egg together.

6. An egg-opening device, that is adapted for use in machines for opening eggs and separating the contents thereof, to open eggs in hingelike fashion, comprising a pair of egg-receiving pockets, each of said pockets having upstanding sides that are pivotally connected to the corresponding sides of the other pocket to permit movement of the pockets relative to each other in hingelike fashion, said upstanding sides being dimensioned so the pivotal connections of the upstanding sides are approximately at the level of the top of an egg held by the pockets, each of said pockets having an open upper portion and a slot in the bottom portion to receive the egg-moving and holding members of said machines for opening eggs and separating the contents thereof, said pockets having portions that conform approximately to the contour of a portion of an egg and are adapted to position the shell of the egg after the egg-breaking operation, egg-opening prongs carried by the said pockets, and means to move the pockets relative to each other.

7. An egg-opening device, that is adapted for use in machines for opening eggs and separating the contents thereof, to open an egg in hingelike fashion, comprising a pair of egg-receiving pockets, each of said pockets having upstanding sides that are pivotally connected to the corresponding sides of the other pocket to permit movement of the pockets relative to each other in hingelike fashion, said upstanding sides being dimensioned so the pivotal connections of the upstanding sides are approximately at the level of the top of an egg held by the pockets, egg-opening prongs removably secured to the said pockets, and means to move the pockets relative to each other, said device being arranged to provide a downward acting force at the top of the egg through the walls of the egg.

8. An egg-moving device, that is adapted for use in machines for opening eggs and separating the contents thereof, to open an egg in hingelike fashion, comprising a pair of egg-receiving pockets, at least one of which pockets has an open end, said pockets being pivotally connected together for rotation about a horizontal axis, egg-moving means positioned adjacent the said one pocket having the open end and being arranged to move eggs into the said pockets, egg-opening prongs carried by the said pockets, links that are actuable to move said pockets into engagement with an egg supported by said egg-moving means whereby the egg-opening prongs of said pockets break the shell of the egg, and pocket-actuating means to cause a rotation of the pockets and the consequent opening of said egg in hingelike fashion, said pivotal connections of said pockets being positioned adjacent the top of an egg held by said pockets whereby the top of the egg may be in the axis of rotation of the pockets and may crack to form a hinge for the parts of the egg.

9. An egg-opening device, adapted for use in machines for opening eggs and separating the contents thereof, to open eggs in hingelike fashion, comprising a plurality of egg receiving pockets, pivotal connections for said pockets, said connections being oppositely disposed of the egg received by said pockets, links carrying at least one of said pockets, pocket-actuating means, and egg opening prongs carried by said pockets, said links being actuable to move said egg-receiving pockets into engagement with an egg whereby the egg opening prongs are forced into the shell of the egg, said pocket actuating means being actuable to cause a rotation of said pockets relative to each other, a consequent splitting of the side and bottom of the egg and a cracking of the top of the egg to form a hinge.

10. An egg-opening device, that is adapted for use in machines for opening eggs and separating the contents thereof, to open eggs in hingelike fashion, comprising a pair of links, a sleeve slidably supported on each of the links, an egg-receiving pocket pivotally connected to the said links, an egg-receiving pocket pivotally connected to the said sleeves, each of said pockets having upstanding sides that are pivotally connected to the corresponding sides of the other pocket to permit movement of the pockets relative to each other in hingelike fashion, said upstanding sides being dimensioned so the pivotal connections between corresponding upstanding sides are approximately at the level of the top of an egg held by the pockets, said pockets having portions that conform approximately to the contour of a portion of an egg and are adapted to position the shell of the egg after the egg-breaking operation, slots in the said pockets to accommodate an egg-moving means that moves eggs into the egg-opening position, egg-opening prongs carried by the said pockets, and means to move the sleeves and thereby move the pockets relative to each other.

11. An egg-opening device, that is adapted for use in machines for opening eggs and separating the contents thereof, to open eggs in hingelike fashion, comprising a pair of links, a sleeve slidably supported on each of the links, an egg-receiving pocket pivotally connected to the said links, an egg-receiving pocket pivotally connected to the said sleeves, each of said pockets having upstanding sides that are pivotally connected to the corresponding sides of the other pocket to permit movement of the pockets relative to each other in hingelike fashion, said upstanding sides being dimensioned so the pivotal connections between corresponding upstanding sides are approximately at the level of the top of an egg held by the pockets, said pockets having portions that conform approximately to the contour of a portion of an egg and are adapted to position the shell of the egg after the egg-breaking operation, egg-opening prongs carried by the said pockets, and means to move the sleeves and thereby move the pockets relative to each other.

12. An egg-opening device, that is adapted for use in machines for opening eggs and separating the contents thereof, to open eggs in hingelike fashion, comprising a pair of links, a sleeve slidably supported on each of the links, an egg-receiving pocket pivotally connected to the said links, an egg-receiving pocket pivotally connected to the said sleeves, each of said pockets having upstanding sides that are pivotally connected to the corresponding sides of the other pocket to permit movement of the pockets relative to each other in hingelike fashion, said upstanding sides being dimensioned so the pivotal connections between corresponding upstanding sides are approximately at the level of the top of an egg held by the pockets, egg-opening prongs carried by the said pockets, and means to move the sleeves and thereby move the pockets relative to each other in arcuate paths.

LAURENCE M. SIGLER.